United States Patent [19]

Johnson

[11] Patent Number: 4,886,315

[45] Date of Patent: Dec. 12, 1989

[54] HARNESS ADJUSTING MECHANISM

[75] Inventor: Edward M. Johnson, Park Forest, Ill.

[73] Assignee: Kolcraft Products, Inc., Chicago, Ill.

[21] Appl. No.: 225,930

[22] Filed: Jul. 29, 1988

[51] Int. Cl.⁴ .............................................. A47D 1/10
[52] U.S. Cl. .................................. 297/250; 297/476; 297/484
[58] Field of Search .............. 297/476, 475, 479, 484, 297/250

[56] References Cited

U.S. PATENT DOCUMENTS

| | | | |
|---|---|---|---|
| 2,195,334 | 3/1940 | Lethern | 297/484 |
| 3,248,148 | 4/1966 | Board et al. | 297/476 |
| 3,288,254 | 11/1966 | Replogle | 297/476 |
| 3,294,447 | 12/1966 | Riley | 297/476 |
| 3,424,496 | 1/1969 | Prough | 297/476 |
| 4,064,574 | 12/1977 | Schnitzler | 297/476 |
| 4,688,849 | 8/1987 | Tsuge et al. | 297/475 |
| 4,770,148 | 1/1988 | Anthony et al. | 297/476 |

*Primary Examiner*—Francis K. Zugel
*Attorney, Agent, or Firm*—Jones, Day, Reavis & Pogue

[57] ABSTRACT

A child's car seat has a restraining harness extending over the child's shoulder and fastenable to the car seat in front of the child. A manually operable reel assembly allows the harness to be selectively loosened or tightened by winding or unwinding the free end of the harness to or from an axle positioned beneath the car seat.

4 Claims, 2 Drawing Sheets

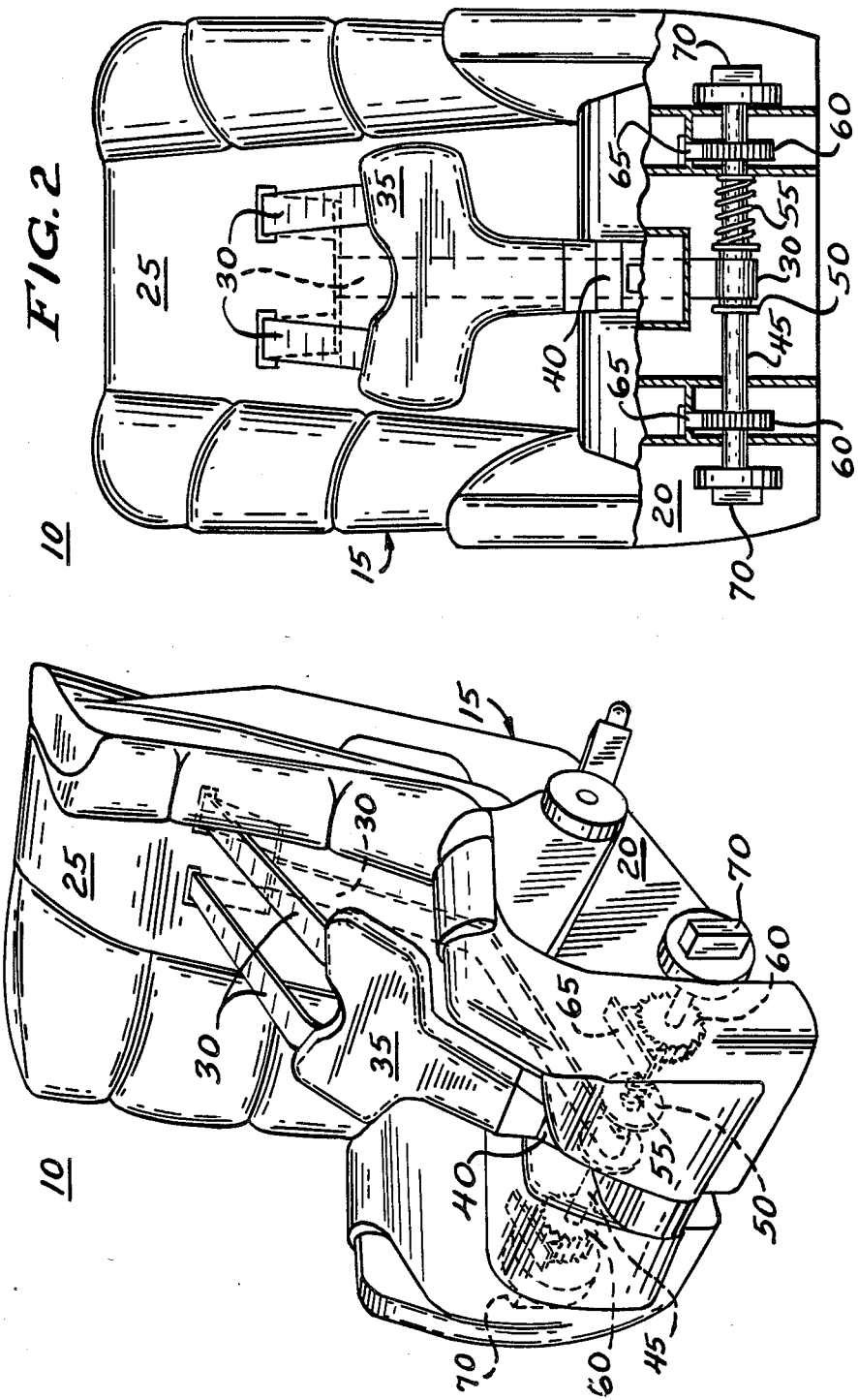

HARNESS ADJUSTING MECHANISM

This invention relates to a mechanism for use in controlling the tension of a harness used to restrain a child in a seat for use in a vehicle.

BACKGROUND OF THE INVENTION

Most means of high speed transportation provide a means for restraining an occupant seated in the vehicle. This includes an automobile, airplane or boat. Because this type of restraining means is generally designed for use by an adult passenger when he or she is seated, such a restraining means is not always appropriate for a child passenger.

In order to overcome the above disadvantage, child passenger securing apparatuses have been used wherein a smaller, auxiliary child's seat is positioned on a seat of a vehicle and secured to the seat by the vehicle's passenger restraining means. The child passenger is then seated in his or her own seat and, by the use of a harness formed from straps or webbing, is restrained into the seat and thereby is protected in case of an accident.

Several types of known child's seats employ reels apparatus for winding up the harness to take up any slack present after the child has been seated, as to store a portion of the harness when not in use. In this type of seat, the reel may be mounted at the rear of the backrest portion of the seat body, the leading end of the restraining harness is unwound from the reel and is passed over the rear portion of the seat's body, over the child's shoulders and is thereafter locked to the seat.

Many such seats use inertia-type reels which are spring-biased to exert a constant "reeling-in" tension on the harness. Such reels are common components in automobile seat belt systems and have the advantage of automatically taking up excess harness slack after the belt is fastened. The reel freely allows the harness belt to be pulled out, and locks upon the sudden change in acceleration encountered in an accidental impact.

Use of spring-biased inertia reels in child's seats has some inherent disadvantages. The reel may enable a child to create slack in the harness after it is locked by allowing more harness to be drawn from the reel. Excessive tensioning of the biasing spring may cause the harness to reel in suddenly when unlocked, causing the locking buckel to strike the child. Another disadvantage in the tendency of such reels to jam, making use of the seat impossible.

Such harnesses are shown in U.S. Pat. Nos. 4,679,852 and 4,660,889. Each of these inventions have difficult to use adjusting mechanisms with locking cams and other complicated mechanisms for restraining the child. Such mechanisms are difficult to utilize when a precocious child is being fastened into the seat for safety.

U.S. Pat. No. 4,688,849 (Tsuge) typifies the inertia reel securing apparatus for a child's car seat, having the disadvantages enumerated above. The inertia reel system is relatively complicated compared to the instant invention.

U.S. Pat. No. 4,025,111 (Tanaka et al.) discloses a restraining and buckle securing system quite similar to that of Tsuge except that no reel is provided and the slack in the harness must be taken up by manually adjusting individual slide buckles.

It is also known to provide a child seat with a harness such as shown in U.S. Pat. Nos. 4,025,111 and 4,342,483. Such harnesses typically includes a pair of belts slidably mounted to the back of the seat which extend over the chest of the child, with the belts having bottom ends removably locked by means of a seat belt buckle and tongue combination secured to the front lower portion of the seat.

One advantage to the use of inertial type belt systems is that the belt is free to move unless the vehicle is in a stopping mode during which the inertial retractor spool stops all such movement. However, when the vehicle is in motion, the belt is freely movable and may allow the child to free himself or herself from the restraining means thereby being exposed to potential harm in case of an accident. A restraining means or web adjuster is shown in U.S. Pat. No. 3,872,550 which discloses a pivotally mounted cam for releasably holding a belt. Operation of the adjuster allows for proper tensioning of the harness. Also known is a harness assembly wherein the ends of the belts are slidably mounted to a split tongue and then secured to the seat frame. The split tongue is removably and lockingly received by a buckle mounted to the seat.

Another drawback to prior seats and restraining harnesses is the excess webbing present which increased the cost of the unit, making more probable the chance of tangled webbing. Of course, with any child seat it may be necessary to extract the child rapidly, and tangled webbing may interfere with rapid egress.

Therefore, one object of the present invention is to provide an improved child safety seat wherein the adjusting means utilizes a minimum amount of webbing while yielding a maximum amount of adjustability. By eliminating excess webbing, another object is met whereby storage means for excess webbing can be eliminated.

It is an object of the invention to provide a child seat in which the user can easily and quickly seat the child but, in an emergency, can rapidly extract the child therefrom.

Another object of the invention is to meet the above objects at a low cost, minimizing the amount of webbing and hardware in the child seat and encouraging the use of plastic parts to make the child seat lightweight and easily transportable.

Another object of the invention is to utilize a mechanism allowing a user to retract or extend the restraining means with one hand while assisting the child with the other hand.

Numerous other advantages and features of the invention will become readily apparent from the following detailed description of a preferred embodiment of the invention, from the claims, and from the accompanying drawings in which like numerals are employed to designate like parts throughout.

BRIEF DESCRIPTION OF THE DRAWINGS

There are further aspects of the present invention which will be better understood by considering the accompanying drawing in which:

FIG. 1 is aperspective view of invention disclosed and claimed herein as used in a child seat;

FIG. 2 is a front plan view of the invention as shown in FIG. 1; and

DETAILED DESCRIPTION OF THE INVENTION

Figure 3:
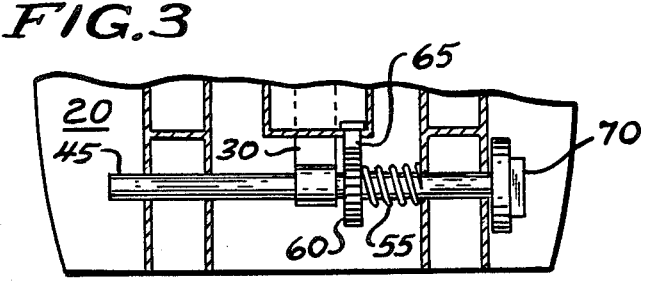
FIGS. 3-7 are partial front plan views of alternative embodiments of the harness adjusting mechanism of the present invention.

While this invention is susceptible of embodiment in many different forms, there is shown in the drawing and will herein be described in detail a preferred embodiment invention. It should be understood that the present disclosure is to be considered an exemplification of the principles of the invention and is not intended to limit the spirit and scope of the invention and/or claims to the embodiment illustrated.

Referring now to FIGS. 1 and 2, there is shown a preferred embodiment 10 of the present invention. Child seat 15 has a seat support 20 and back support 25.

A harness means or elongated webbing 30 is shown positioned through back support 25 and running along and beneath seat support 20 of child safety seat 15. Abdominal pad 35 is shown affixed to webbing 30 which is fastened to a buckle type release 40, affixed to seat support 20.

Figure 7:
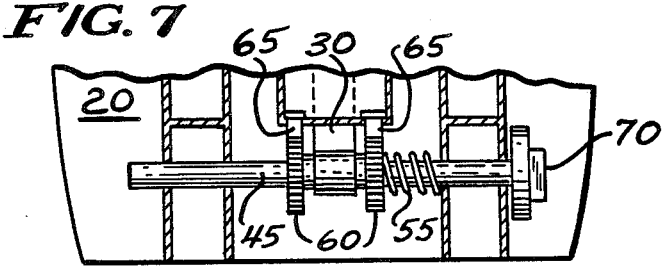

Webbing 30 is positioned throughout underneath back support 25 and seat support 20 and is affixed to roller spool 50 which is coaxially positioned on elongated bar 45 which is positioned and retained within seat support 20. Roller spool 50 is tension-biased by helical spring 55 against seat support 20. Rack 60 is positioned on elongated bar 45 and is complemented by pinion 65. In the preferred embodiment, shown in FIG. 2, two sets of racks 60 and pinions 65 are positioned side by side although a single rack and pinion may be configured as shown in FIG. 3. Racks 60 and pinions 65 may be positioned inwardly as shown in FIG. 7. Rack 60 and pinion 65 can also be replaced by other well known apparatus featuring selectively disengageable gears, such as ratchet and pawl or other alternatives.

Figure 4:
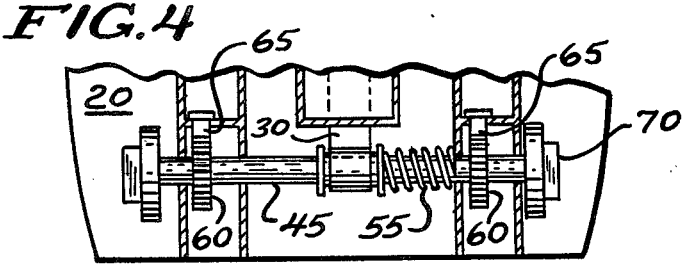

Affixed to the ends of elongated bar 45 are manual adjusting means 70 as shown in FIGS. 1, 2, and 4. Hand adjusting means 70 may be an easily gripped knob in order to operably rotate bar 45.___ is rotated by first grasping knob 70 and either pushing from the left side or pulling from the right side to overcome the tension of spring 55 so as to laterally disengage racks 60 from pinions 65 thereby allowing bar 45 to be freely rotatable and in turn roller spool 50 inertia to take up or loosen webbing 30 of apparatus 10.

FIG. 3 depicts a single rack 60 and pinion 65 embodiment positioned closer to the center of elongated bar 45 without the use of a roller spool 50 thereby allowing webbing 30 to be wrapped directly onto bar 45, while FIG. 7 shows a similar arrangement utilizing two such gears. The alternative embodiment shown in FIG. 3 is utilized by pulling on knob 70 by overcoming the resistance of spring 55 to disengage rack 60 from pinion 65 thereby allowing bar 45 to be rotatable to either loosen or tighten webbing 30.

Figure 5:
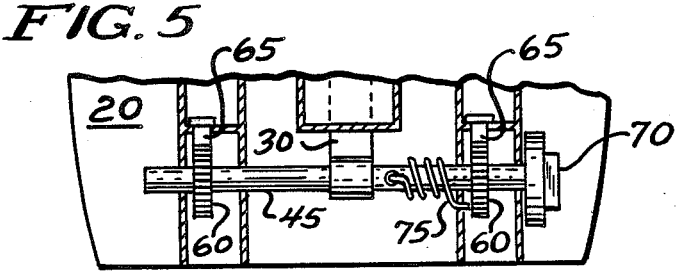

FIG. 5 depicts a spring biased embodiment in which a biased spring 75 provides a constant tension on bar 45 in order to keep the appropriate tension on webbing 30. Knob 70 must be pulled to disengage rack 60 and pinion 65 in order to have bias spring 75 effect the rotation of bar 45 thereto.

Figure 6:
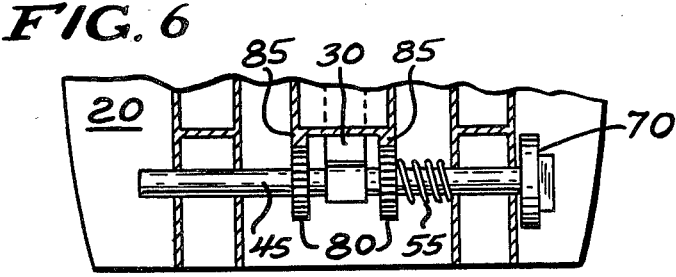

FIG. 6 depicts an alternative embodiment in which toothed gears 80 are positioned on bar 45 to meet and join pawls or pinions 85 fashioned from the bottom of the seat support 20.

While the foregoing has presented specific embodiments of the present invention it is to be understood that these embodiments have been presented by way of example only. It is expected that others will perceive differences which, while bearing from the foregoing, do not depart from the spirit and scope of the invention herein described and claimed.

What is claimed:

1. A child seat for use in a vehicle, said child seat having an adjustable retaining harness mechanism, comprising:
   - a child seat configured to receive a child mountable upon an automobile seat,
   - harness means positioned to releasably restrain a child in said child seat, said harness means having a first and a second end,
   - said first end of said harness means detachably affixed to said seat
   - manual tensioning and locking means to tension said second end of said harness means and to prevent further tensioning or loosening of said second end of said harness means;
   - said tensioning and locking means including a horizontally extending axle to which said second end of said harness means and a disengageable locking assembly are affixed; and
   - said axle being spring biased so as to maintain the locking assembly in releasably locking engagement.

2. The invention of claim 1, wherein said axle further includes a spool fixably mounted thereon operable for winding or unwinding said second end of said harness means.

3. The invention of claim 1, further comprising at least one hand adjusting means attached to said axle for the operation of said tensioning and locking means.

4. The invention of claim 3, wherein said hand adjusting means, can both rotate said axle about its axis and move the axle transverse along its axis.

* * * * *